(12) United States Patent
Peyser et al.

(10) Patent No.: US 7,797,193 B1
(45) Date of Patent: *Sep. 14, 2010

(54) SYSTEMS AND METHODS FOR DISTRIBUTING TELECOMMUNICATION SERVICES VIA A NETWORK

(75) Inventors: Charles A. Peyser, Bethesda, MD (US); Constance Beyer, McLean, VA (US); Michael D. McLaughlin, Saratoga, CA (US); Daniel Jones, Reston, VA (US)

(73) Assignee: Simplexity, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/425,739

(22) Filed: Oct. 22, 1999

Related U.S. Application Data

(60) Provisional application No. 60/138,509, filed on Jun. 10, 1999.

(51) Int. Cl.
*G06Q 30/00* (2006.01)
(52) U.S. Cl. .................... 705/26; 379/93.12
(58) Field of Classification Search .............. 705/26, 705/80, 27
See application file for complete search history.

(56) References Cited

U.S. PATENT DOCUMENTS

| | | |
|---|---|---|
| 4,629,836 A | 12/1986 | Walsworth |
| 4,799,156 A | 1/1989 | Shavit et al. ............... 364/401 |
| 4,903,201 A | 2/1990 | Wagner |
| 5,027,388 A | 6/1991 | Bradshaw et al. |
| 5,272,747 A | 12/1993 | Meads |
| 5,289,526 A | 2/1994 | Chymyck et al. |
| 5,416,833 A | 5/1995 | Harper et al. |
| 5,471,526 A | 11/1995 | Linnermark et al. |
| 5,572,571 A | 11/1996 | Shirai |
| 5,682,525 A * | 10/1997 | Bouve et al. ................. 340/995 |
| 5,710,887 A | 1/1998 | Chelliah et al. |
| 5,748,485 A | 5/1998 | Christiansen et al. |

(Continued)

FOREIGN PATENT DOCUMENTS

EP    0858231 A2    8/1998

(Continued)

OTHER PUBLICATIONS

Telezoo.com, "Telezoo.com introduces first "request for proposal" internet site for telecommunications vendors and buyers", PR Newswire, May 4, 1999.*

(Continued)

*Primary Examiner*—Mark Fadok
(74) *Attorney, Agent, or Firm*—Patton Boggs LLP

(57) ABSTRACT

A system facilitates the purchase of telecommunication services from a variety of sellers. The system stores a set of responses to purchase requests for telecommunication services associated with a plurality of service providers, each response reflecting at least one telecommunication service offering associated with one of the service providers and a related cost for the telecommunication service offering. The system establishes a session for considering the purchase of telecommunication services. A purchase request is input, including information indicating a requested telecommunication service. The system accesses the stored set of responses to purchase requests for at least one response reflecting at least one telecommunication service offering capable of satisfying the requested telecommunication service, and permits a requester to accept the response during the session.

8 Claims, 16 Drawing Sheets

U.S. PATENT DOCUMENTS

| | | | |
|---|---|---|---|
| 5,758,328 A | 5/1998 | Giovannoli | |
| 5,794,207 A | 8/1998 | Walker et al. | 705/23 |
| 5,794,219 A | 8/1998 | Brown | |
| 5,815,665 A | 9/1998 | Teper et al. | |
| 5,819,029 A | 10/1998 | Edwards et al. | |
| 5,828,956 A | 10/1998 | Shirai | |
| 5,832,457 A | 11/1998 | O'Brien et al. | |
| 5,835,896 A | 11/1998 | Fisher et al. | |
| 5,845,265 A | 12/1998 | Woolston | 705/37 |
| 5,862,223 A | 1/1999 | Walker et al. | |
| 5,864,604 A | 1/1999 | Moen et al. | |
| 5,881,131 A | 3/1999 | Farris et al. | |
| 5,897,620 A | 4/1999 | Walker et al. | 705/5 |
| 5,905,975 A * | 5/1999 | Ausubel | 705/26 |
| 5,917,897 A * | 6/1999 | Johnson et al. | 379/114 |
| 5,949,875 A * | 9/1999 | Walker et al. | 702/78 |
| 5,974,398 A * | 10/1999 | Hanson et al. | 705/14 |
| 5,999,908 A | 12/1999 | Abelow | |
| 5,999,973 A | 12/1999 | Glitho et al. | |
| 6,006,251 A * | 12/1999 | Toyouchi et al. | 709/100 |
| 6,018,656 A | 1/2000 | Shirai | |
| 6,023,685 A * | 2/2000 | Brett et al. | 705/26 |
| 6,023,686 A * | 2/2000 | Brown | 705/37 |
| 6,047,274 A * | 4/2000 | Johnson et al. | 705/412 |
| 6,052,447 A | 4/2000 | Golden et al. | |
| 6,055,504 A | 4/2000 | Chou et al. | |
| 6,055,513 A | 4/2000 | Katz et al. | |
| 6,085,171 A | 7/2000 | Leonard | |
| 6,104,798 A | 8/2000 | Lickiss et al. | |
| 6,128,742 A | 10/2000 | Felt | |
| 6,131,087 A * | 10/2000 | Luke et al. | 705/26 |
| 6,141,653 A * | 10/2000 | Conklin et al. | 705/80 |
| 6,144,727 A | 11/2000 | Mashinsky | |
| 6,167,124 A | 12/2000 | Johnson et al. | |
| 6,167,383 A | 12/2000 | Henson | |
| 6,205,211 B1 * | 3/2001 | Thomas et al. | 379/114 |
| 6,222,536 B1 * | 4/2001 | Kihl et al. | 705/1 |
| 6,223,290 B1 | 4/2001 | Larsen et al. | |
| 6,226,365 B1 * | 5/2001 | Mashinsky | 379/114.02 |
| 6,233,566 B1 * | 5/2001 | Levine et al. | 705/36 |
| 6,240,172 B1 | 5/2001 | Zhu | |
| 6,260,024 B1 | 7/2001 | Shkedy | |
| 6,269,157 B1 | 7/2001 | Coyle | |
| 6,269,343 B1 | 7/2001 | Pallakoff | |
| 6,298,125 B1 | 10/2001 | Goldberg et al. | |
| 6,301,574 B1 | 10/2001 | Thomas et al. | |
| 6,345,090 B1 | 2/2002 | Walker et al. | |
| 6,385,594 B1 * | 5/2002 | Lebda et al. | 705/1 |
| 6,389,117 B1 | 5/2002 | Gross et al. | |
| 8,418,415 | 7/2002 | Walker et al | |
| 6,584,451 B1 * | 6/2003 | Shoham et al. | 705/37 |
| 6,598,026 B1 * | 7/2003 | Ojha et al. | 705/26 |
| 6,604,239 B1 | 8/2003 | Kohen | |
| 6,611,590 B1 | 8/2003 | Lu et al. | |
| 7,133,835 B1 * | 11/2006 | Fusz et al. | 705/26 |
| 2001/0014868 A1 | 8/2001 | Herz et al. | |
| 2001/0023402 A1 | 9/2001 | Flynn | |
| 2002/0001372 A1 | 1/2002 | Katz | |
| 2002/0186845 A1 | 12/2002 | Dutta et al. | |
| 2004/0020982 A1 | 2/2004 | Hoffman et al. | |
| 2005/0261987 A1 | 11/2005 | Bezos et al. | |

FOREIGN PATENT DOCUMENTS

| | | | |
|---|---|---|---|
| JP | 9-212549 A | 8/1997 | |
| WO | WO 01/84840 | 11/2001 | |
| WO | WO 02/01891 | 1/2002 | |

OTHER PUBLICATIONS

Tellezoo.com2: telecommunications Mar . . . Products and connectivity services, http://www.telezoo.com, 5 pages, dated Aug. 9, 1999.*

Accompany—nternet Purchasing through aggregation, access & advocacy, http://www.accompany.com, 3 pages.

Telezoo.com: telecommunications Mar . . . Products and Connectivity Services, http://www.telezoo.com, 5 pages.

Demandline.com: How Demandline.com Works, http://www.demandline.com, 6 pages (accessed Jan. 6, 2000).

Demandline.com: How Demandline.com Works, http://www.demandline.com; 6 pages.

Anon., "Industry.Net Teams With PNC Bank on Web Commerce," Newsbytes News Network, Sep. 26, 1996.

In the US Patent and Trademark Office in re: U.S. Appl. No. 09/390,025, Non-Final Office Action dated Jul. 11, 2002, 6 pages.

In the US Patent and Trademark Office in re: U.S. Appl. No. 09/390,025, Non-Final Office Action dated May 9, 2003, 11 pages.

In the US Patent and Trademark Office in re: U.S. Appl. No. 09/390,026, Final Office Action dated Dec. 4, 2007, 12 pages.

In the US Patent and Trademark Office in re: U.S. Appl. No. 09/390,026, Final Office Action dated Feb. 23, 2004, 24 pages.

In the US Patent and Trademark Office in re: U.S. Appl. No. 09/390,026, Final Office Action dated Feb. 5, 2007, 7 pages.

In the US Patent and Trademark Office in re: U.S. Appl. No. 09/390,026, Final Office Action dated Mar. 16, 2006, 16 pages.

In the US Patent and Trademark Office in re: U.S. Appl. No. 09/390,026, Final Office Action dated May 18, 2009, 13 pages.

In the US Patent and Trademark Office in re: U.S. Appl. No. 09/390,026, Non-Final Office Action dated Apr. 8, 2005, 15 pages.

In the US Patent and Trademark Office in re: U.S. Appl. No. 09/390,026, Non-Final Office Action dated Aug. 18, 2008, 9 pages.

In the US Patent and Trademark Office in re: U.S. Appl. No. 09/390,026, Non-Final Office Action dated Aug. 2, 2006, 7 pages.

In the US Patent and Trandmark Office in re: U.S. Appl. No. 09/390,026, Non-Final Office Action dated Feb. 12, 2003, 19 pages.

In the US Patent and Trademark Office in re: U.S. Appl. No. 09/390,026, Non-Final Office Action dated Jul. 18, 2007, 15 pages.

In the US Patent and Trademark Office in re: U.S. Appl. No. 09/390,026, Non-Final Office Action dated Jul. 28, 2003, 17 pages.

In the US Patent and Trademark Office in re: U.S. Appl. No. 09/390,026, Non-Final Office Action dated Jun. 14, 2002, 7 pages.

In the US Patent and Trademark Office in re: U.S. Appl. No. 09/390,026, Non-Final Office Action dated Sep. 14, 2004, 19 pages.

Anon., "Bell Offers Answers for Commonly Asked Questions," St. Louis Buiness Journal, vol. 7, No. 26, s.3, p. 1C, Mar. 23 1987.

"NaviNet to Showcase Next Generation Dial-up IP Services," Business Wire, Jun. 2, 1999.

Anon., "Third-Party Phone Firms' Troubles Told," Denver Post, C-02, Mar. 23, 1994.

Anon.; "Industry Net Teams with PNC Bank on Web Commerce"; Newsbytes News Network; Sep. 26, 1996.

Dennis, S., "Electric Lightwave Ready to Offer Local Number Portability May 21, 1998," Newsbytes, May 21, 1998 (Abstract).

Press release, "VoiceLog Passes 100,000 Mark on Third Party Verifications"; PR Newswire, Aug. 22, 1997: extracted on Internet from Dialog database.

Salazar; "The Fight Against Slamming and Cramming"; Press Release; http://www.ago.state.co.us/ PRESREL/presr100/prsr14.htm; Jan. 21, 2000.

* cited by examiner

242

| RFP NO. 1 | BUYER INFO | TYPES OF SERVICE | QUESTIONS | PRIOR USAGE |
| --- | --- | --- | --- | --- |
| RFP NO. 2 | BUYER INFO | TYPES OF SERVICE | QUESTIONS | PRIOR USAGE |
| RFP NO. 3 | BUYER INFO | TYPES OF SERVICE | QUESTIONS | PRIOR USAGE |
| ... | ... | ... | ... | ... |
| RFP NO. N | BUYER INFO | TYPES OF SERVICE | QUESTIONS | PRIOR USAGE |

| BUYER ID NAME | RFP NO. N1 | RFP REPLY 1 | RFP REPLY 2 | ... | RFP REPLY N |
| --- | --- | --- | --- | --- | --- |
|  | RFP NO. N2 | RFP REPLY 1 | RFP REPLY 2 | ... | RFP REPLY M |
|  | RFP NO. N3 | RFP REPLY 1 | RFP REPLY 2 | ... | RFP REPLY L |
| ... | | | | | |
| BUYER ID NAME | RFP NO. M1 | RFP REPLY 1 | RFP REPLY 2 | ... | RFP REPLY N |

SYSTEMS AND METHODS FOR DISTRIBUTING TELECOMMUNICATION SERVICES VIA A NETWORK

RELATED APPLICATIONS

This application claims priority from U.S. Provisional Application No. 60/138,509, entitled "Methods For Providing Telecommunications Service Buying and Selling Via the Internet," filed on Jun. 10, 1999, which is incorporated herein by reference.

This application is related to copending U.S. application Ser. No. 09/390,026, entitled "Systems and Methods For Buying and Selling Telecommunication Services Via a Network," which is incorporated herein by reference. This application claims priority to U.S. application Ser. No. 09/390,025 filed on Sep. 3, 1999, entitled "Systems and Methods For Aggregating Buyers For the Purchase of Telecommunication Services Via a Network," which is incorporated herein by reference.

FIELD OF THE INVENTION

The present invention relates generally to the purchase of telecommunication services and, more particularly, to a forum through which buyers can purchase telecommunication services from a variety of sellers via a network, such as the Internet.

BACKGROUND OF THE INVENTION

Traditionally, telecommunication services, such as local, long distance, Internet, cellular services, etc., have been bought and sold through the interaction of people. Typically, the buy-sell process takes one of two forms: (1) a buyer determines the necessary telecommunication service requirements and contacts one or more sellers of these services; or (2) a seller proactively solicits the buyer, who may or may not be ready to purchase the services.

For larger-sized companies, the service requirements are usually complex and the buyer sophisticated. Therefore, the first form typically predominates (i.e., a buyer initiates the communication with a seller in these instances). For small and medium-sized companies, as well as for consumers, the service requirements are usually much less complex and the buyer less sophisticated. Therefore, the second form typically predominates. The seller contacts the buyer via different methods, such as door-to-door canvassing, telemarketing, direct mailing, advertising, etc.

A major disadvantage of the conventional buy-sell process is that sellers typically control the process. This is especially true in the case of consumers, small businesses, and associations. As a result, it is often difficult for these buyers to get the best possible deal.

Therefore, there is a need to shift control to buyers in the purchase of telecommunication services.

SUMMARY OF THE INVENTION

Systems and methods consistent with the present invention address this need by aggregating buyer purchase power in the purchase of telecommunication services.

In accordance with the purpose of the invention as embodied and broadly described herein, a system consistent with the present invention facilitates the purchase of telecommunication services from a variety of sellers. The system stores a set of responses to purchase requests for telecommunication services associated with a plurality of service providers, each response reflecting at least one telecommunication service offering associated with one of the service providers and a related cost for the telecommunication service offering. The system establishes a session for considering the purchase of telecommunication services. A purchase request is input, including information indicating a requested telecommunication service. The system accesses the stored set of responses to purchase requests for at least one response reflecting at least one telecommunication service offering capable of satisfying the requested telecommunication service, and permits a requester to accept the response during the session.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 3A is an exemplary diagram of the request for proposal (RFP) database of FIG. 2;

FIG. 3B is an exemplary diagram of the buyer database of FIG. 2;

DETAILED DESCRIPTION

The following detailed description of implementations consistent with the present invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide a forum through which buyers and sellers of telecommunication services interact. The buyers specify the types of services desired and the sellers submit proposals for providing the services. The buyers select the proposals that meet their requirements and contract with the particular sellers to provide the desired services and/or additional services.

System Elements

Figure 1:
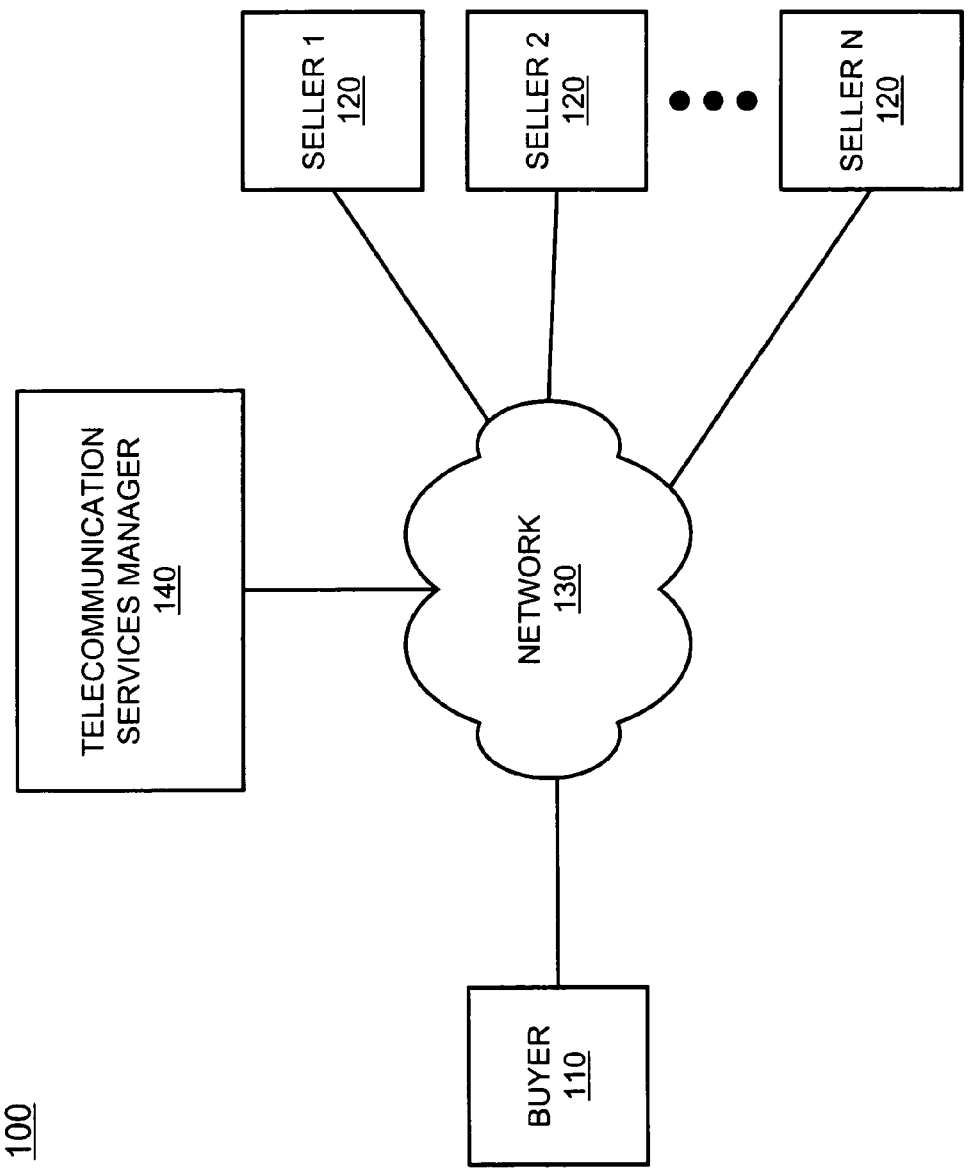
FIG. 1 is an exemplary diagram of a system consistent with the present invention.

FIG. 1 is an exemplary diagram of a system 100 consistent with the present invention. The system 100 includes a buyer terminal 110 connected to several seller terminals 120 via a network 130. The system also includes a telecommunication services manager 140 connected to the buyer and seller terminals 110 and 120, respectively, via the network 130.

The buyer terminal 110 may include a personal computer, such as an IBM-compatible computer, or the like, with a connection to the network 130. A single buyer terminal 110 has been shown for simplicity. Those skilled in the art will note that the present invention contemplates more than one buyer terminal 110 connected to the network 130. The seller terminals 120 may also include personal computers with connections to the network 130. The network 130 may include the Internet, an intranet, or some equivalent data network.

Figure 2:
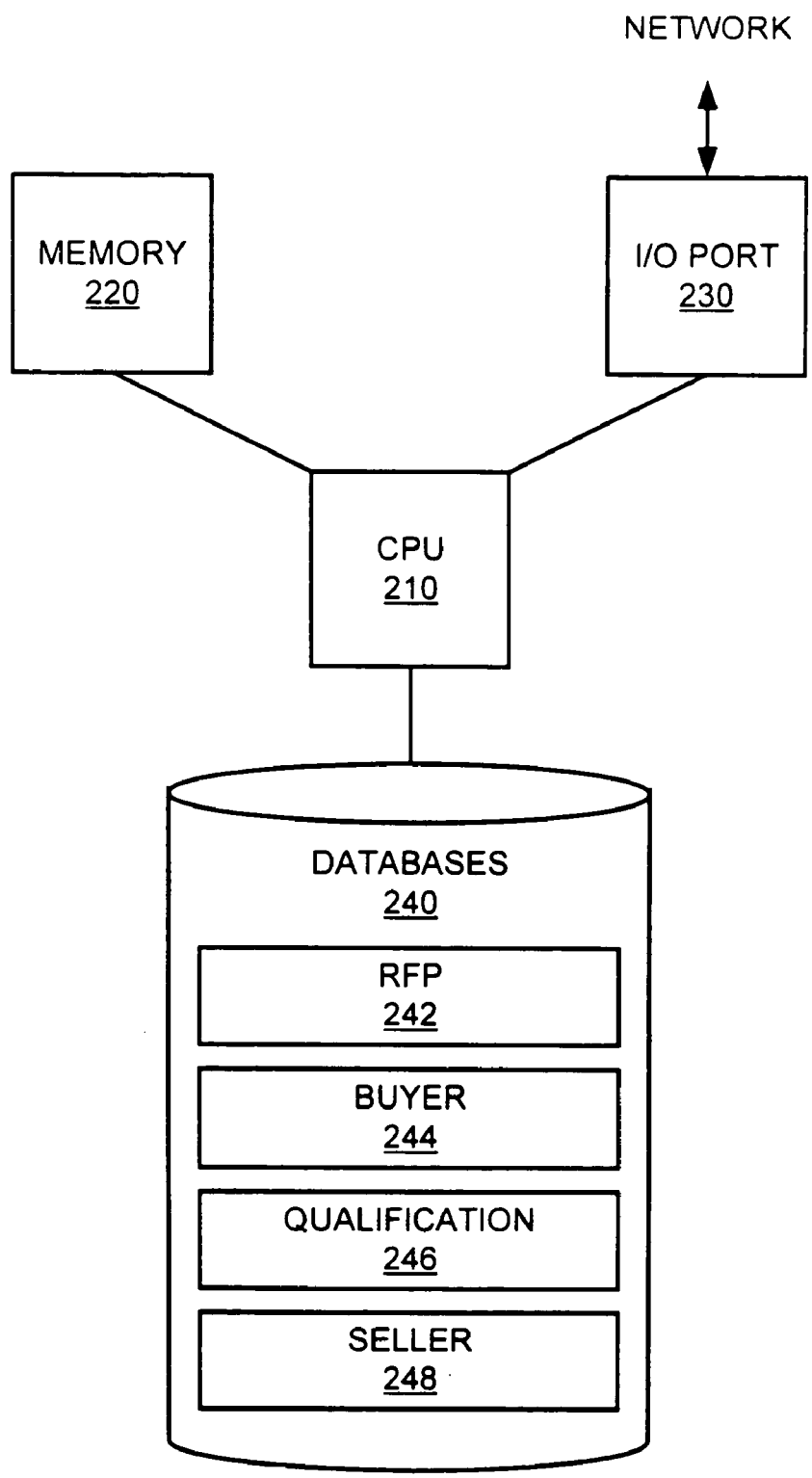
FIG. 2 is an exemplary diagram of the telecommunication services manager of FIG. 1.

The telecommunication services manager (TSM) 140 provides a forum through which the buyer terminal 110 can interact with the seller terminals 120 to purchase telecommunication services. FIG. 2 is an exemplary diagram of TSM 140, including a processor 210, at least one memory 220, an input/output (I/O) port 230, and a set of databases 240. The processor 210 may include any conventional microprocessor, such as a Pentium produced by Intel. The memory 220 includes one or more conventional storage devices, such as RAM, ROM, EEPROM, etc. The I/O port 230 is a conventional communication port for communicating with the network 130.

The databases 240 include a large capacity storage device that contains at least four sets of databases: a request for proposal (RFP) database 242, a buyer database 244, a qualification database 246, and a seller database 248. The RFP database 242 stores RFPs prepared by buyers.

FIG. 3A is an exemplary diagram of the RFP database 242. Each entry in the RFP database 242 includes multiple fields for information on an RFP, including an RFP number 310, buyer information 320, types of service data 330, question data 340, and prior usage data 350. The RFP number 310 uniquely identifies a particular RFP. The buyer information 320 includes information describing the buyer, including, for example, the buyer's name, address, location, company, possibly information on other buyers (e.g., others referred to TSM 140 by the buyer), credit information, etc. This information may be provided by the buyer or obtained from one or more commercial databases.

The types of service data 330 includes information identifying the services that the buyer wishes to purchase. The question data 340 includes particular questions for the sellers posed by the buyer. The prior usage data 350 includes data regarding prior telephone service usage by the buyer and/or estimates or assumptions on such usage derived from the buyer's answers to a set of queries provided by TSM 140.

The buyer database 244 (FIG. 2) stores RFP replies. An RFP reply is a seller's answer to an RFP. FIG. 3B is an exemplary diagram of the buyer database 244. Each entry in the buyer database 244 includes multiple fields for information regarding an RFP, including a buyer ID name 360, an RFP number 370, and one or more RFP replies 380. The buyer ID name 360 uniquely identifies a buyer. The RFP number 370 is the same as the RFP number 310 that uniquely identifies an RFP. There may be more than one RFP number 370 associated with a single buyer, if the buyer submitted more than one RFP. Each of the RFP replies 380 includes a seller's response to the buyer's RFP.

The qualification database 246 (FIG. 2) stores rules for qualifying a buyer to use the system 100. The database 246 includes rules, for example, that validate the identity of a buyer by comparing the buyer's contact information, social security number, or federal tax identification to a commercially available database or by analyzing the buyer's email address. Of course, other qualification rules may be used.

The seller database 248 stores seller information, such as boilerplate RFP replies and filter data, and may contain an area for the sellers to store data. The filter data contains criteria provided by the sellers as to the types of RFPs they want to receive. For example, a seller might indicate that they will provide service to only particular areas and desire RFPs requesting service in these areas.

Processing for Purchasing Telecommunication Services

Figure 4:
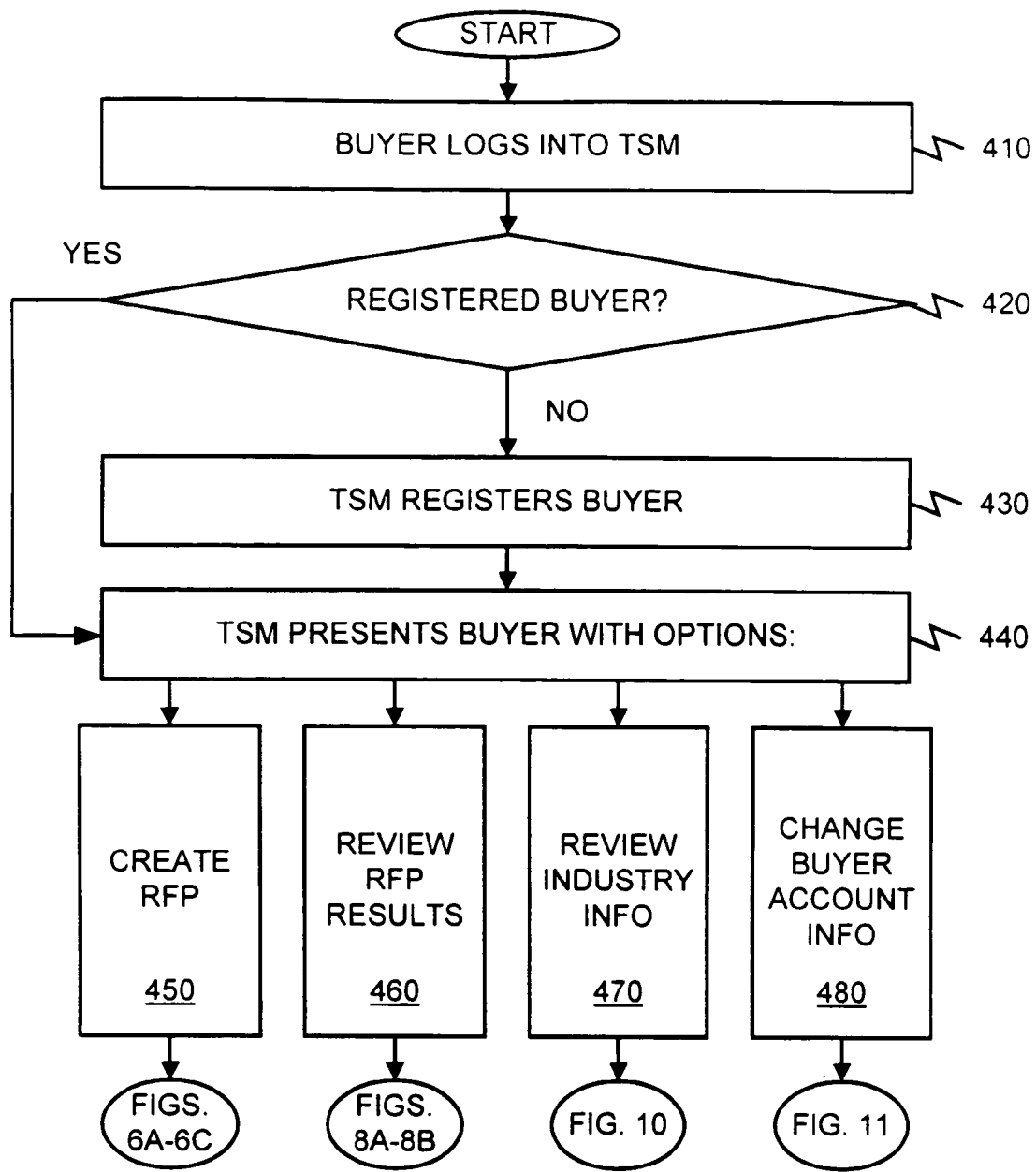
FIG. 4 is a flowchart of processing for purchasing telecommunication services in a manner consistent with the present invention.

FIG. 4 is a flowchart of processing for purchasing telecommunication services in a manner consistent with the present invention. The processing begins when a buyer, using buyer terminal 110, logs into TSM 140 via the network 130 [step 410]. The buyer may do this directly by using a conventional modem or some other connection or indirectly by entering an Internet address to access TSM's web site on the world wide web.

Once logged in, TSM 140 determines whether the buyer is registered, for example, by requiring the buyer to enter a login identifier and password [step 420]. It is also possible to store this information in a special file on the buyer terminal 110 so that when the buyer accesses the TSM web site, the stored information is provided automatically to TSM 140 for verification. If the buyer has not previously registered, TSM 410 registers the buyer [step 430].

Figure 5:
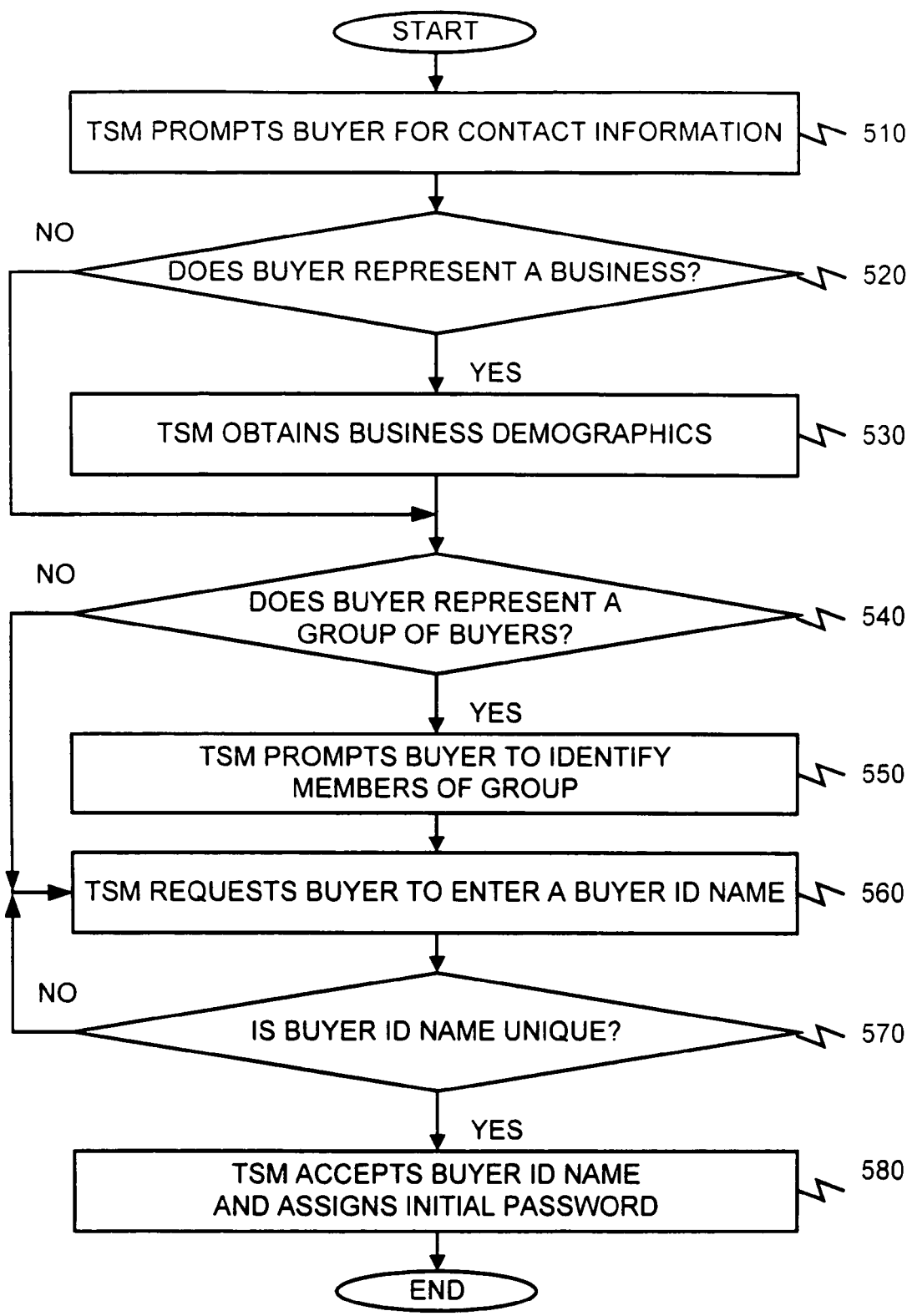
FIG. 5 is a flowchart of processing for registering a buyer in a manner consistent with the present invention.

FIG. 5 is a flowchart of processing for registering a buyer in a manner consistent with the present invention. TSM 140 prompts the buyer to enter contact information [step 510]. The contact information might include the buyer's name, title, telephone and fax numbers, email address, and/or the name of the buyer's business. From this information, TSM 140 determines whether the buyer represents a business [step 520]. If so, TSM 140 prompts the buyer for business demographics, including, for example, the company size, industry, number of locations, whether there are any international sites, typical monthly spending on telecommunication services, etc. [step 530]. Alternatively or additionally, TSM 140 accesses a commercial database to obtain this information.

Once TSM 140 obtains the business demographics or if the buyer does not represent a business, TSM 140 determines whether the buyer represents a group of buyers [step 540]. The buyer may represent a group of buyers, such as a group of family and friends, association members, a group of small businesses, etc., that have previously agreed, or have agreed based on a recommendation of TSM 140, to submit an RFP for their telecommunication services. The seller that wins the selection provides service to all members of the group, though some members may be permitted to later drop out. This aggregation of buyers helps the buyers obtain a better price from the sellers by combining their purchasing power. If the buyer represents a group, TSM 410 prompts the buyer to identify the group representative and the members of the group by name or number (i.e., size) [step 550].

Once TSM 140 obtains the group information or if the buyer does not represent a group, TSM 140 requests that the buyer enter a buyer ID name [step 560]. The buyer ID name uniquely identifies the buyer and typically consists of several alphanumeric characters. TSM 140 then determines whether the ID name that the buyer entered is unique, possibly by comparing the name with a database of previously entered names [step 570]. If the name has already been taken, TSM 140 informs the buyer to enter another name [step 560]. TSM 140 then accepts the unique buyer ID name and assigns an initial password [step 580]. TSM 140 may then send the initial password to the buyer via email, regular mail, or by other mechanisms.

Once the buyer successfully registers, TSM 140 presents the buyer with several options [step 440] (FIG. 4): (1) to create an RFP; (2) to review results of previously submitted RFPs; (3) to review industry information; and (4) to change buyer account information. If the buyer decides to create an RFP [step 450], processing continues with the flowcharts of FIGS. 6A-6C. If the buyer decides to review results of previously submitted RFPs [step 460], processing continues with the flowcharts of FIGS. 8A and 8B. If the buyer decides to review industry information [step 470], processing continues with the flowchart of FIG. 10. Finally, if the buyer decides to change account information [step 480], processing continues with the flowchart of FIG. 11.

Processing for Creating an RFP

Figure 6A:
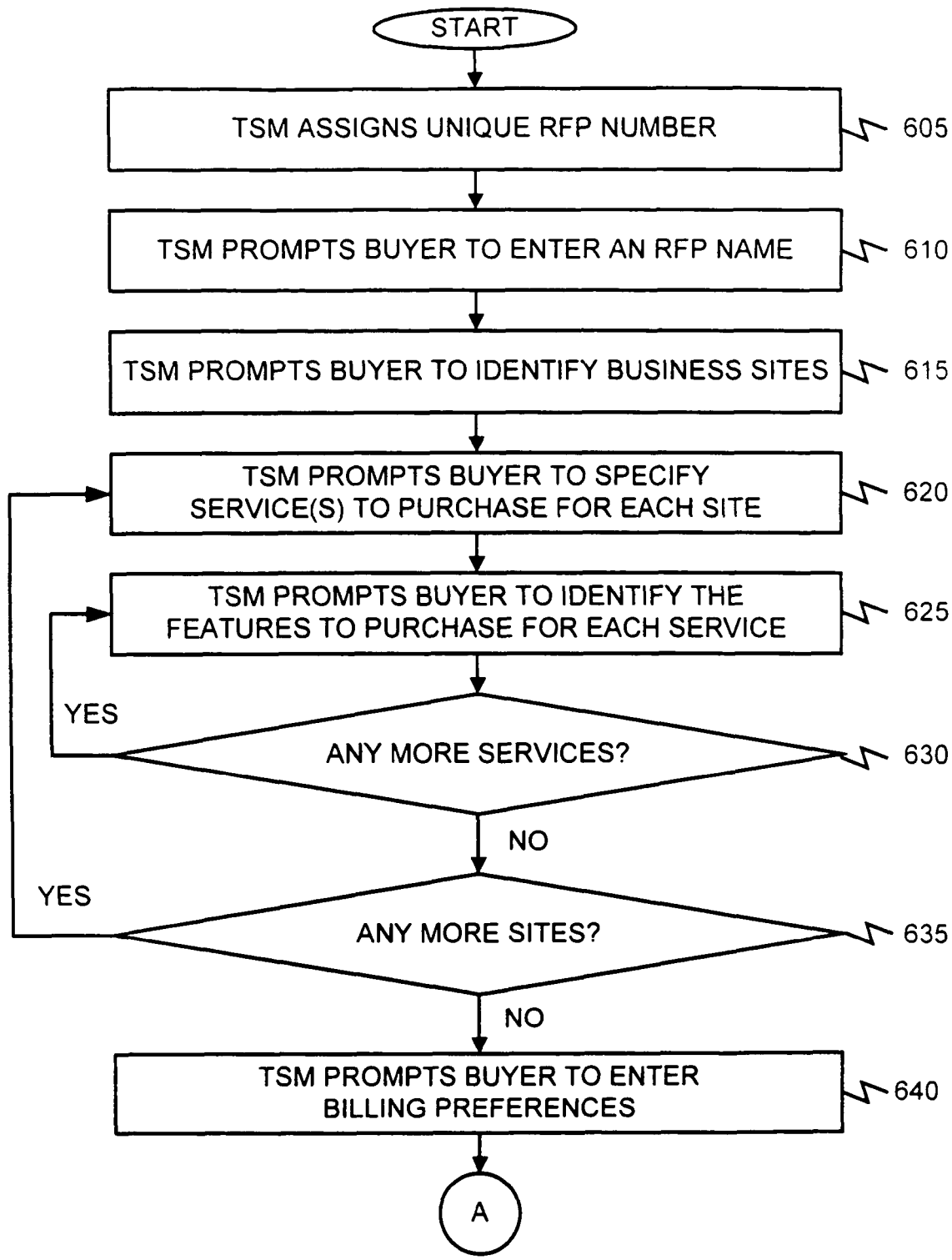
FIGS. 6A-6C are flowcharts of processing for creating an RFP in a manner consistent with the present invention.
Figure 6B:
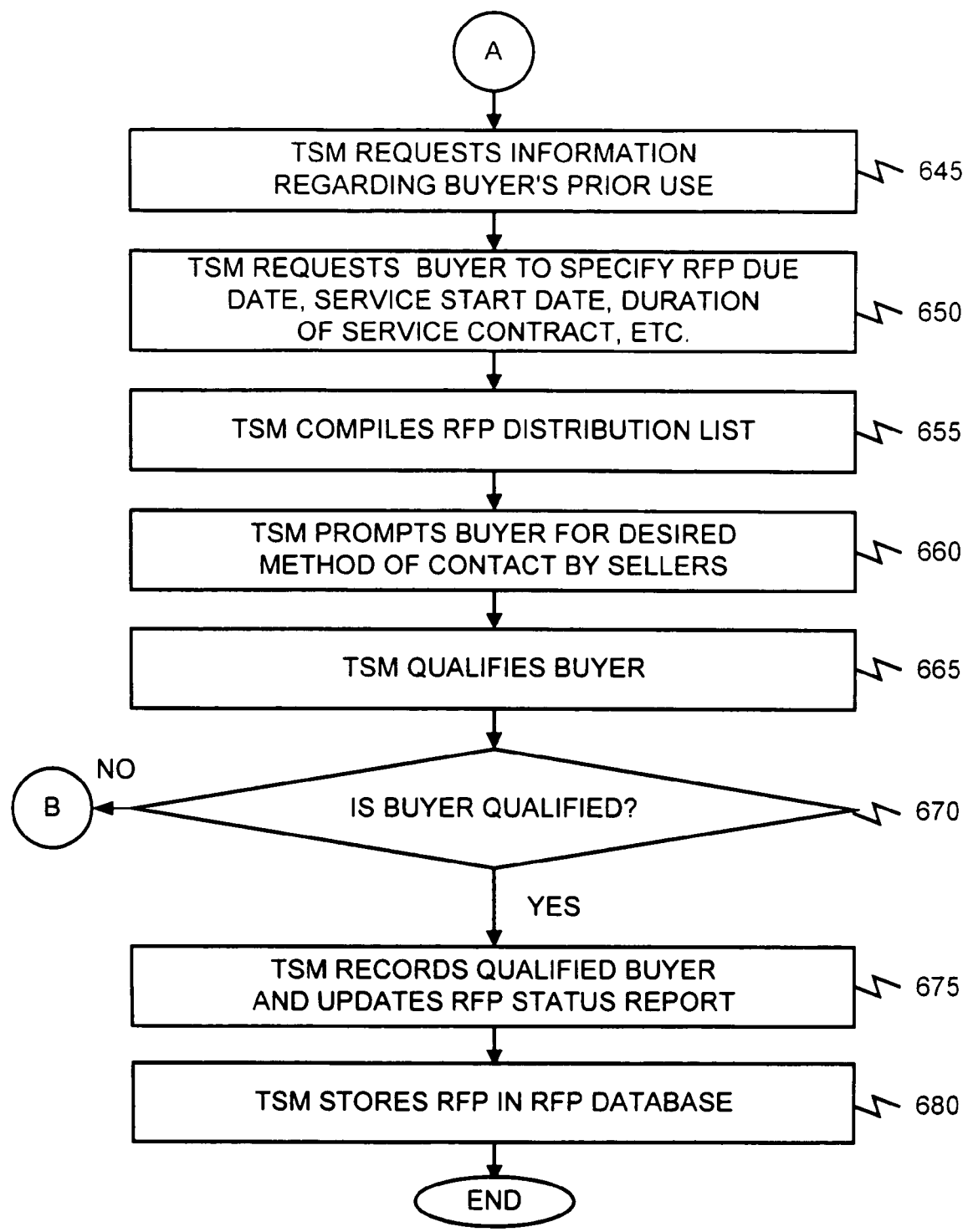
Figure 6C:
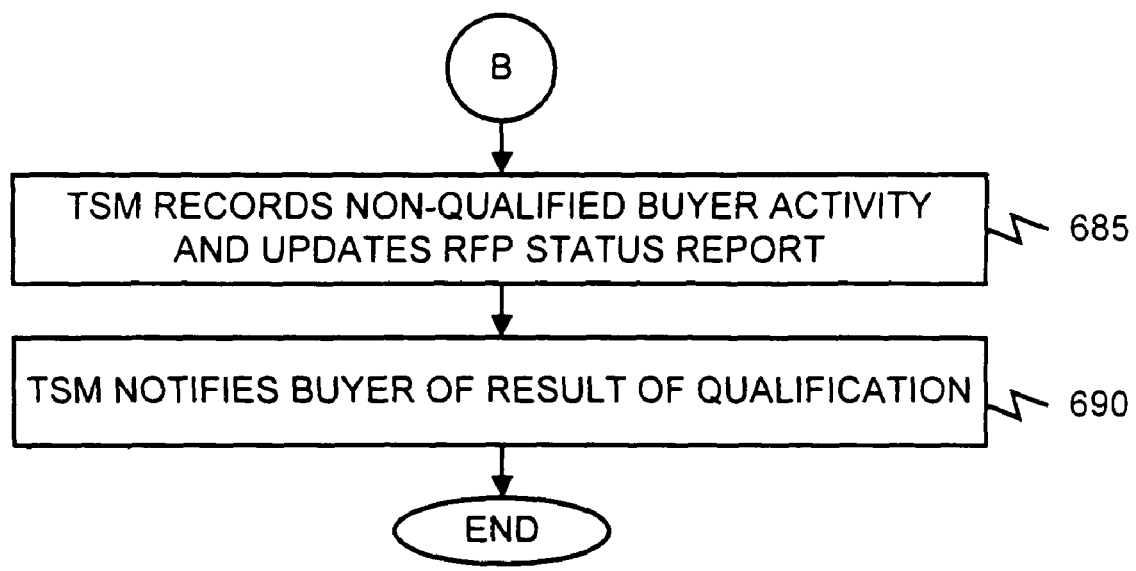

FIGS. 6A-6C are flowcharts of processing for creating an RFP in a manner consistent with the present invention. Although a series of steps is provided, the order of the steps does not matter. When the buyer chooses to create an RFP, TSM 140 generates a unique RFP number for it [step 605] (FIG. 6A). TSM 140 then prompts the buyer to provide a descriptive name for the RFP [step 610].

Next, TSM 140 requests that the buyer identify the business sites for which service is sought [step 615]. TSM 140 prompts the buyer to specify the service(s) desired for each business site [step 620]. The buyer might select among several types of services, such as local, long distance, toll free, calling card, Internet, conference calling, private line/data, etc. Alternatively or additionally, the buyer might authorize TSM 140 to obtain customer service records from the buyer's local telephone company. For each service selected, TSM 140 prompts the buyer to identify the features to purchase [step 625]. The buyer might indicate that a feature is required, desired, or not wanted, and may indicate whether a service is new for the site or is replacing an already existing service.

Once the buyer identifies all the desired services for each site [steps 630 and 635], TSM 140 prompts the buyer for billing preference information [step 640]. The buyer specifies the name(s) and address(es) for the service bill. In certain instances, the buyer may also specify other billing parameters, such as the date upon which the bill will be due each month.

Next, TSM 140 requests that the buyer provide information regarding prior use of telecommunication services [step 645] (FIG. 6B). The buyer might provide copies of recent telecommunication service bills by fax, email, or regular mail or the buyer might enter this information into an electronic form provided by TSM 140. Alternatively, TSM 140 may access a database that contains this information. At this time, the buyer might also specify any changes to the prior usage. If no prior use data exists, such as in the case of a new company, the buyer might project the usage.

TSM 140 then prompts the buyer to specify the RFP dates, such as the RFP reply due date, the start of services date, and the duration of services date [step 650]. The RFP reply date is the date by which all sellers must respond. The start of services date is the date upon which the buyer wants the new services to begin. The duration of services date is the length of the service contract desired by the buyer. Typically, the buyer specifies service contract lengths in terms of six month increments. The buyer may also include one or more questions for potential sellers regarding their services.

Next, TSM 140 compiles an RFP distribution list [step 655]. TSM 140 may present an alphabetical list of participating sellers from which the buyer may select those to include on the RFP distribution list. Only those sellers included in the list will receive the buyer's RFP. TSM 140 then requests that the buyer identify preferred methods of contact by the sellers [step 660]. For example, the buyer might specify that the sellers communicate only through TSM 140, that the sellers communicate via regular mail, or that the sellers communicate directly with the buyer via email, telephone, etc.

TSM 140 qualifies the buyer according to the rules stored in the qualification database 246 to minimize the number of fraudulent RFPs submitted to the system 100 [step 665]. TSM 140 may qualify the buyer by comparing the buyer's contact information, social security number, or federal tax identification to a commercially available database, by analyzing the buyer's email address, or by other mechanisms to verify the identity of the buyer.

If the buyer passes the qualification process [step 670], TSM 140 records that the buyer is qualified and updates an RFP status report to change the status of the RFP from "Submitted" to "Distributed" [step 675]. TSM 140 then stores the RFP in the RFP database 242 [step 680].

If the buyer fails the qualification process [step 670], TSM 140 records the activity of the non-qualified buyer and updates the RFP status report to indicate so [step 685] (FIG. 6C). TSM 140 then notifies the buyer of the result of the qualification process [step 690]. If the buyer is a legitimate buyer, TSM 140 may permit the buyer to contact a service agent to prove the buyer's legitimacy.

Figure 7:
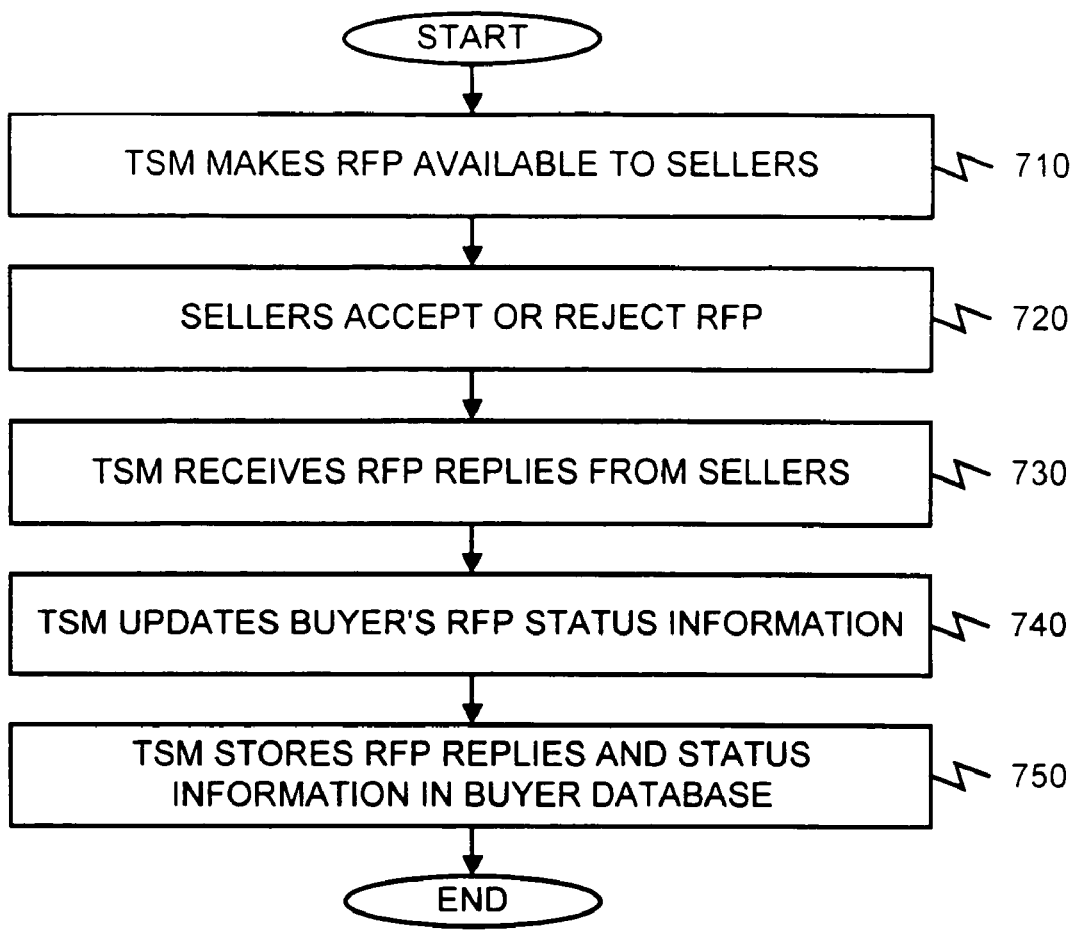
FIG. 7 is a flowchart of processing for distributing an RFP in a manner consistent with the present invention.

Once the buyer completes the RFP, TSM 140 distributes it. FIG. 7 is a flowchart of processing for distributing an RFP in a manner consistent with the present invention. TSM 140 uses the filter data in the seller database 248 to determine the manner for distributing the RFP to the sellers on the distribution list. In other words, TSM 140 analyzes the filter data corresponding to the sellers on the distribution list to identify which sellers will receive the RFP and makes it available to them [step 710]. Sellers may then access the RFP via the TSM web site with the appropriate log on identifier and password. Alternatively, TSM 140 might send the RFP to the sellers via email, regular mail, fax, etc.

Once the RFP is made available, the individual sellers determine whether to accept or reject it [step 720]. The sellers then generate replies for the RFP based on whether the RFP is accepted or rejected. TSM 140 receives the RFP replies from the sellers [step 730] and updates the buyer's RFP status information to indicate whether the RFP was accepted or rejected by the seller [step 740]. TSM 140 then stores the RFP replies and the status information in the buyer database 244 [step 750].

Processing for Reviewing RFP Results

Figure 8A:
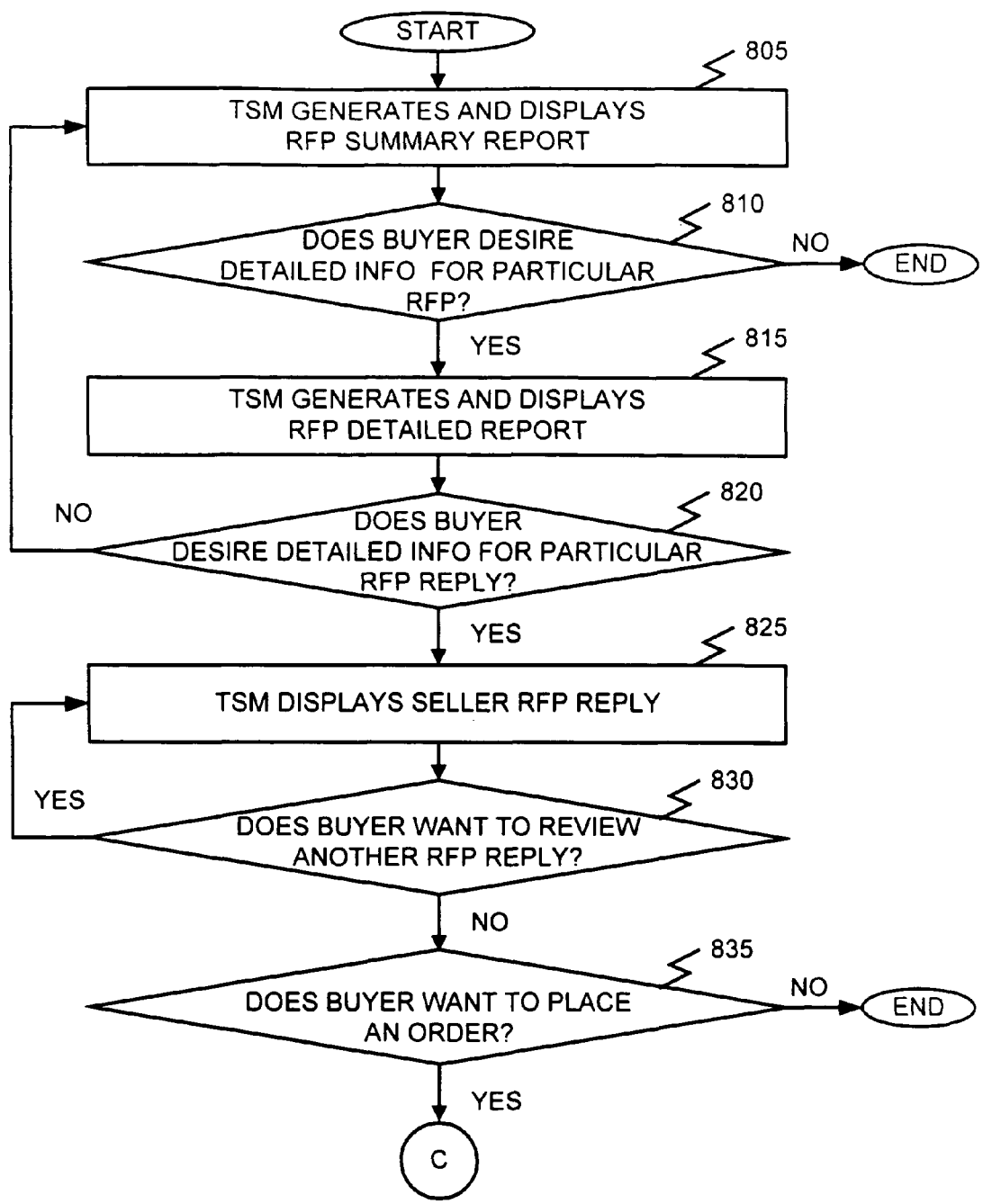
FIGS. 8A and 8B are flowcharts of processing for reviewing results of previously submitted RFPs in a manner consistent with the present invention.
Figure 8B:
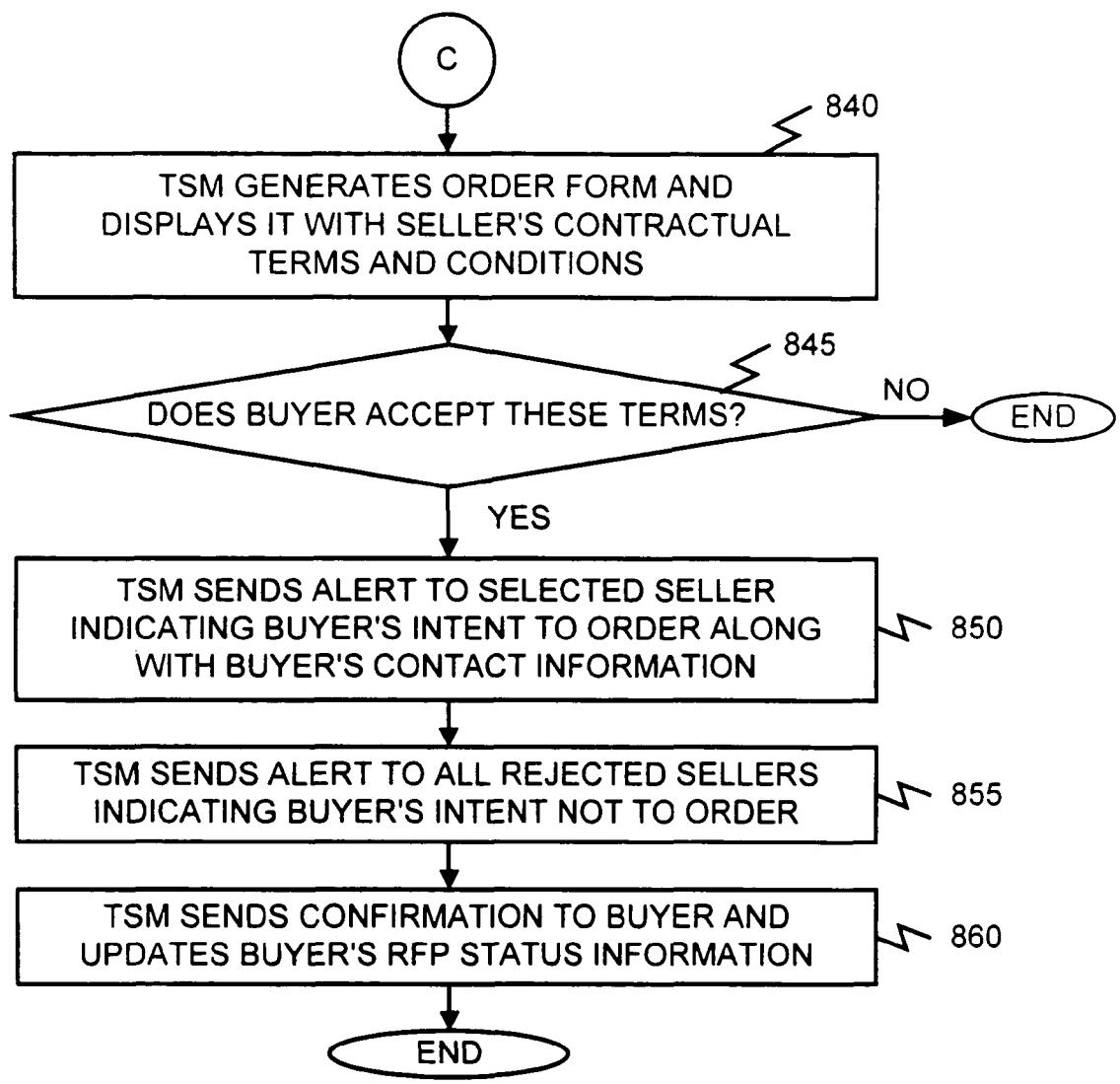

FIGS. 8A and 8B are flowcharts of processing for reviewing results of previously submitted RFPs in a manner consistent with the present invention. When a buyer wants to see the results of a previously submitted RFP, TSM 140 generates and displays an RFP summary report [step 805]. TSM 140 periodically updates the report as it receives RFP replies from the sellers.

Figure 9A:
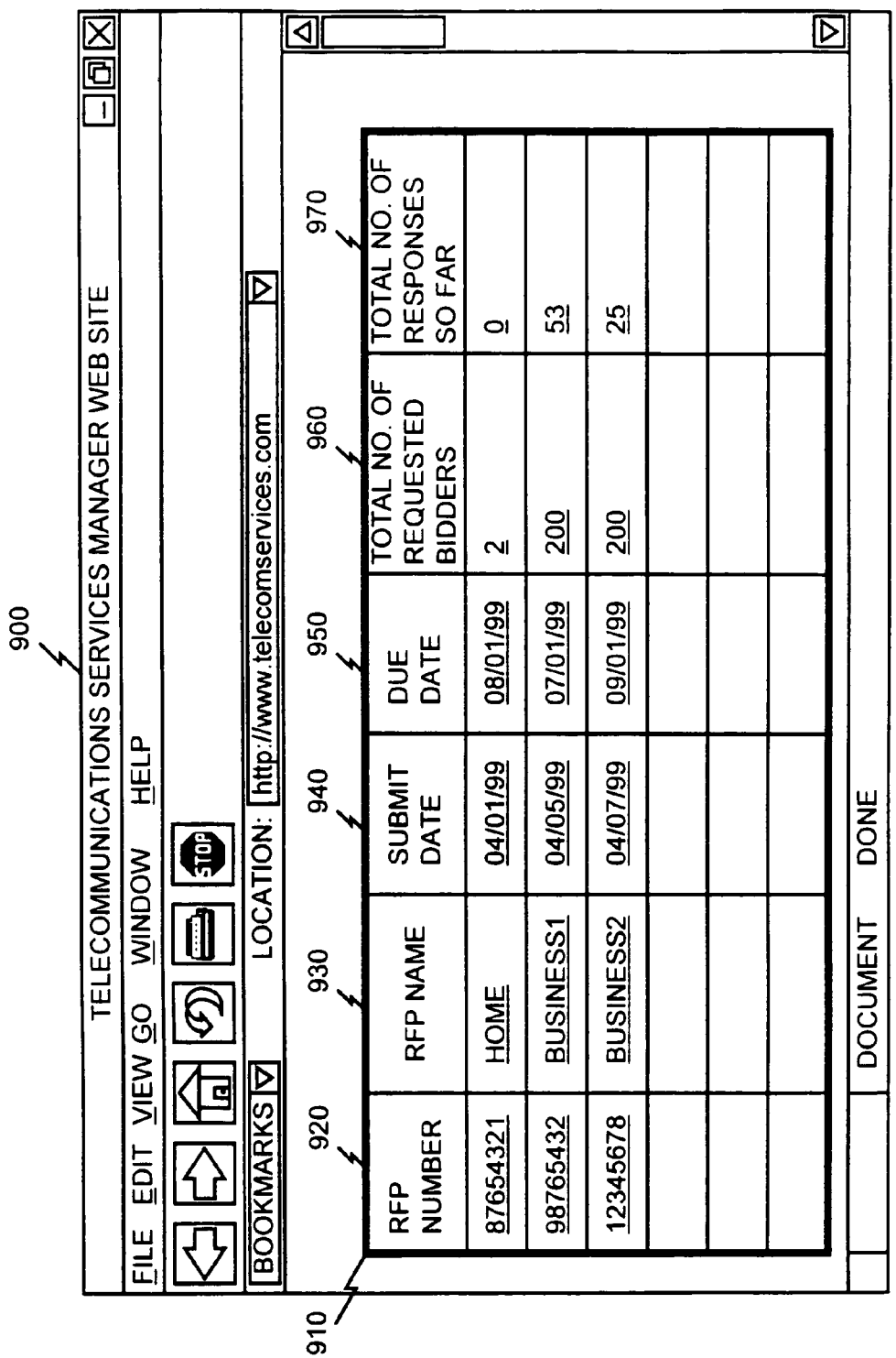
FIG. 9A is a diagram of an exemplary user interface containing an RFP summary report.

FIG. 9A is a diagram of an exemplary user interface in the form of a web page 900 containing an RFP summary report 910 consistent with the present invention. The summary report 910 includes an RFP number 920, an RFP name 930, a submit date 940, a due date 950, a total number of requested bidders 960, and a total number of responses so far 970. The RFP number 920 uniquely identifies an RFP. The buyer may have submitted more than one RFP and, therefore, may have more than one RFP number. The RFP name 930 is the name that the buyer provided for the RFP.

The submit date 940 is the date that the buyer completed the RFP. The due date 950 is the date by which all sellers must respond to the RFP to have their RFP replies considered by the buyer. The total number of requested bidders 960 is the total number of sellers on the RFP distribution list. The total number of responses so far 970 is the number of responses received from the sellers to date.

TSM 140 determines whether the buyer desires detailed information regarding a particular RFP shown in the RFP summary report based on input from the buyer [step 810] (FIG. 8A). If so, TSM 140 generates and displays a detailed report for the RFP [step 815].

Figure 9B:
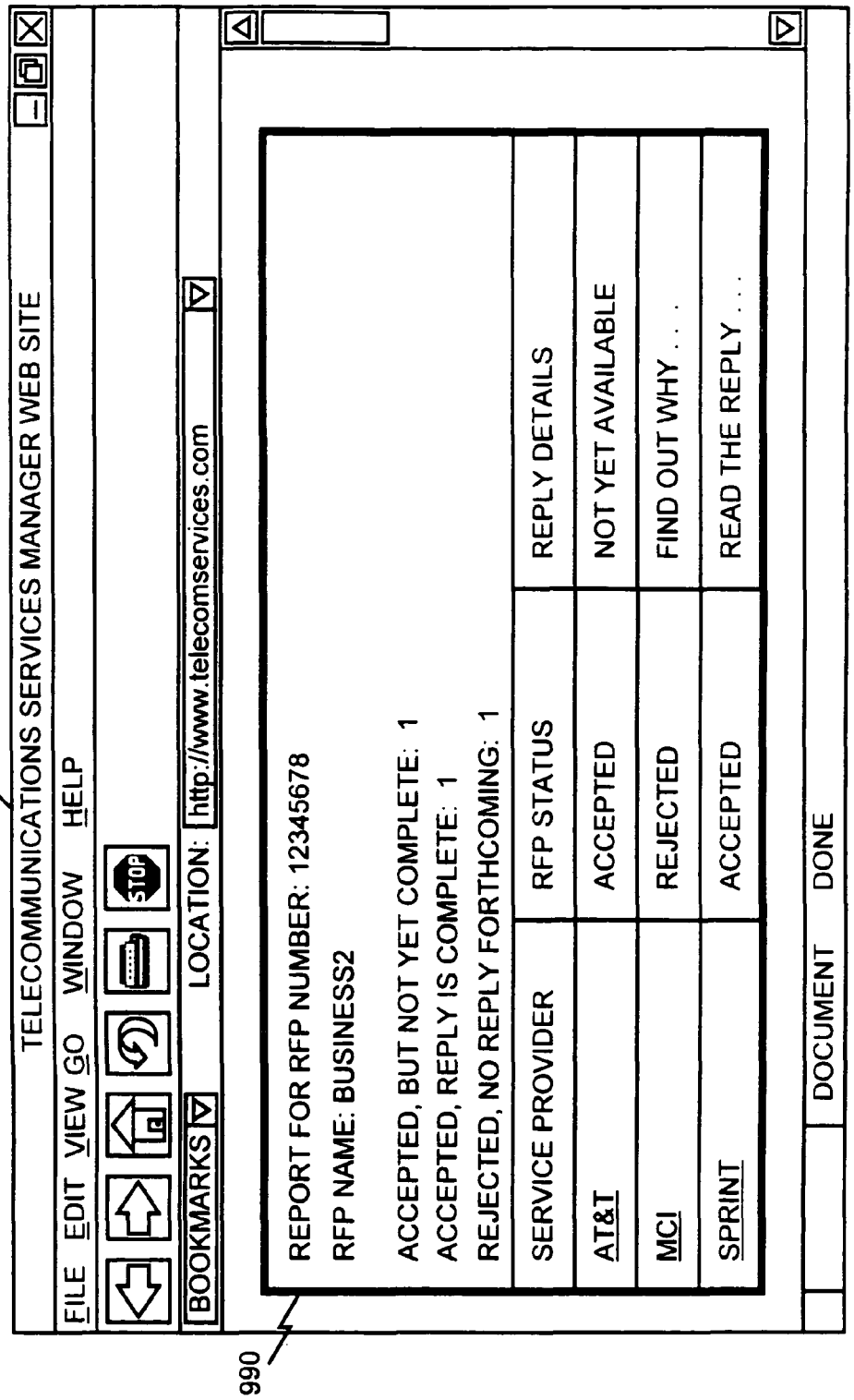
FIG. 9B is a diagram of an exemplary user interface containing an RFP detailed report.

FIG. 9B is a diagram of an exemplary user interface in the form of a web page 980 containing an RFP detailed report 990 consistent with the present invention. The detailed report 990 includes both the RFP number and name, as well as the status of the sellers' analysis. The status might include "Accepted, but not yet complete," "Accepted, reply is complete," or "Rejected, no reply forthcoming." The report 990 might also identify the sellers on the distribution list and the status of each reply. The buyer may select one of the sellers from the report to read the reply or find out why the RFP was rejected.

TSM 140 determines whether the buyer desires detailed information regarding any particular RFP reply based on input from the buyer [step 820] (FIG. 8A). If so, TSM 140 displays the reply for the buyer [step 825]. Alternatively, TSM 140 might email a copy of the reply to the buyer. If the buyer wants to review another RFP reply [step 830], TSM 140 displays the reply for the buyer [step 825]. If the buyer finally decides to place an order [step 835], TSM 140 generates an order form containing the specifics from the seller's RFP reply and displays it along with the seller's contractual terms and conditions [step 840] (FIG. 8B).

If the buyer accepts the terms and conditions [step 845], TSM 140 sends an alert to the selected seller indicating the buyer's intent to order, along with the buyer's contact information [step 850]. Of course, TSM 140 might inform the seller, and possibly all sellers, of the buyer's contact information at some earlier point. Once selected, the seller may contact the buyer to sign a contract for the desired telecommunication services.

TSM 140 also notifies all of the rejected sellers that the buyer does not intend to order from them [step 855]. Finally, TSM 140 sends a confirmation to the buyer and updates the buyer's RFP status information [step 860].

Processing for Reviewing Industry Information

Figure 10:
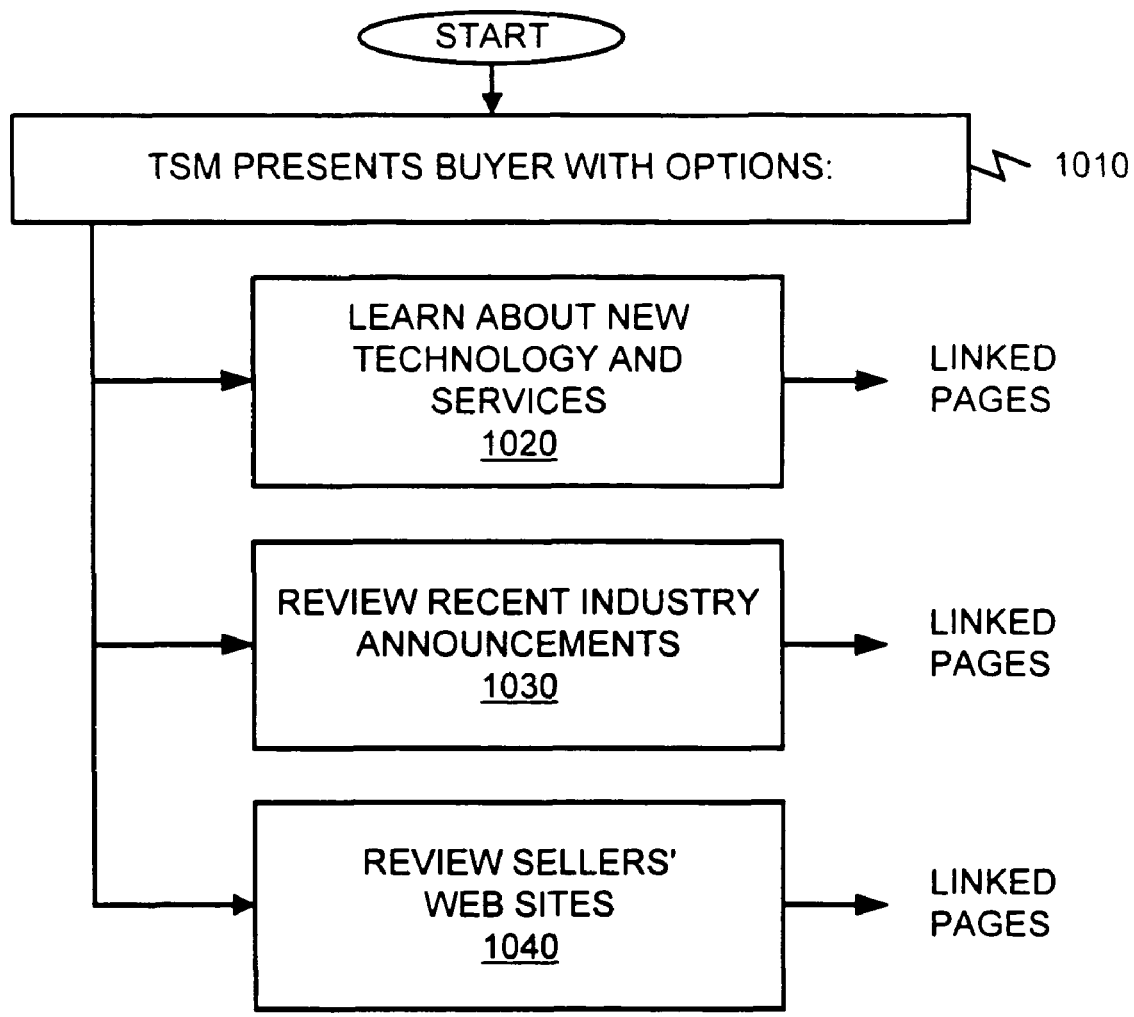
FIG. 10 is a flowchart of processing for reviewing industry information in a manner consistent with the present invention.

FIG. 10 is a flowchart of processing for reviewing industry information in a manner consistent with the present invention. When a buyer indicates a desire to review industry information, TSM 140 presents the buyer with several options [step 1010], such as to learn about new technology and services, to review recent industry announcements, and to review sellers' web sites.

If the buyer wants to learn about new technology and services [step 1020], TSM 140 links the buyer to web pages providing such information using conventional technology. If the buyer wants to review recent industry announcements [step 1030], TSM 140 links the buyer to web pages providing this information using conventional technology. If the buyer wants to review sellers' web sites [step 1040], TSM 140 links the buyer to these web sites over the network 130 using conventional technology.

Processing for Changing Buyer Account Information

Figure 11:
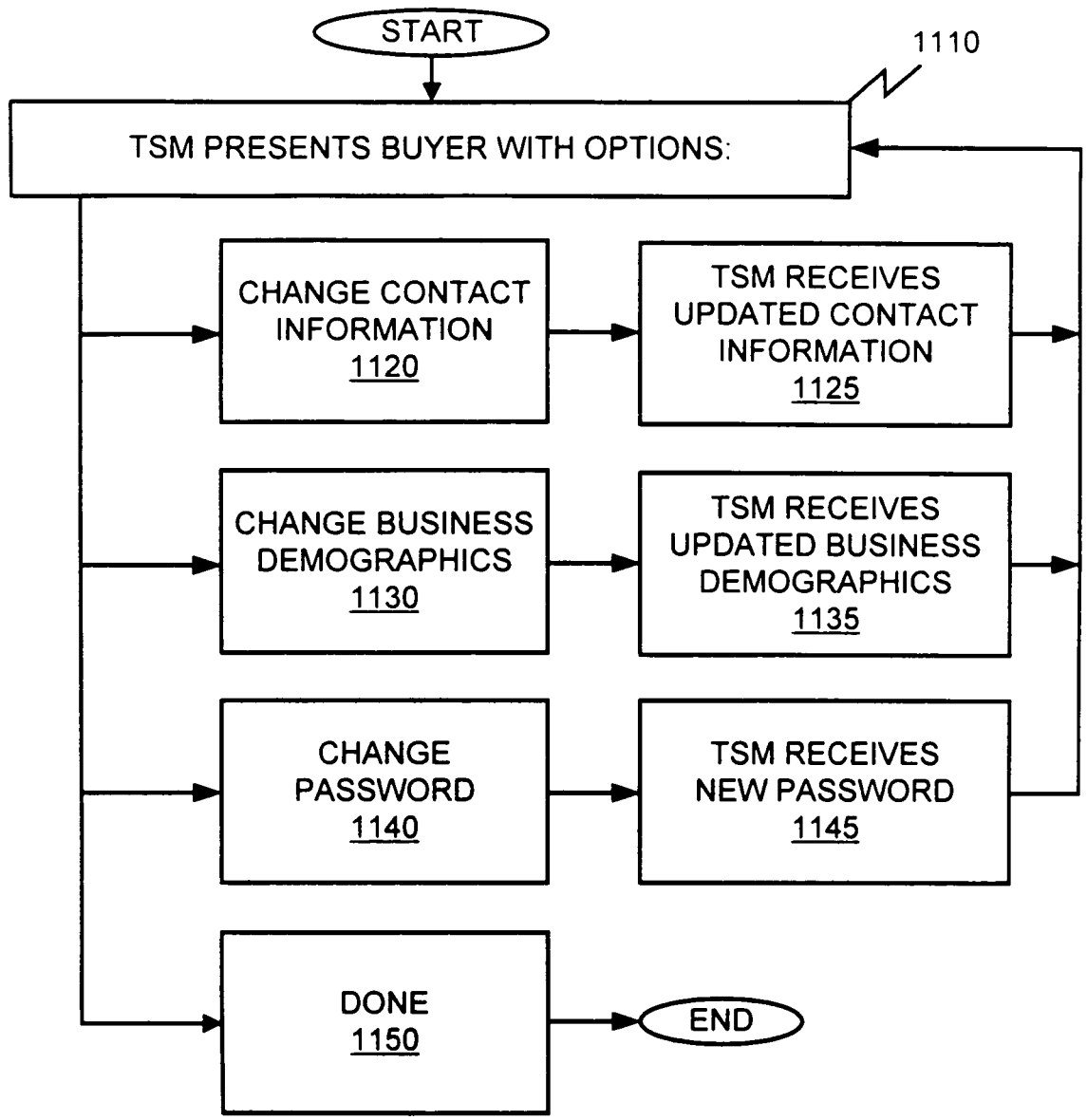
FIG. 11 is a flowchart of processing for changing buyer account information in a manner consistent with the present invention.

FIG. 11 is a flowchart of processing for changing buyer account information in a manner consistent with the present invention. When the buyer wants to change the buyer's account information, TSM 140 presents the buyer with several options [step 1110], such as to change contact information, to change business demographics, and to change password.

If the buyer wants to change the contact information [step 1120], TSM 140 presents the buyer with the current information and permits the buyer to change it. TSM 140 receives the updated contact information and stores it [step 1125]. If the buyer wants to change the business demographics [step 1130], TSM 140 presents the buyer with the current information and permits the buyer to change it. TSM 140 receives the updated business demographics and stores it [step 1135].

If the buyer wants to change the password [step 1140], TSM 140 prompts the buyer to enter the current password and then the new password twice. TSM receives the new password, and if the current password is correct and the two entries of the new password match, TSM 140 records the new password [step 1145]. When the buyer completes all changes, the buyer so indicates [step 1150].

In an alternative configuration, TSM 140 forms a "spot market" for the sellers' offerings. A spot market is a market for available goods or services in which sellers of those goods or services control the market for their offerings but use an intermediary to make the market, i.e., bringing buyers and sellers together. As a market maker this intermediary is distinguishable from an agent for the seller because agents generally have flexibility when selling goods or services on behalf of sellers, including for example the ability to offer discounts. A market maker for a spot market generally does not have such flexibility.

Spot Markets

In this alternative configuration, TSM 140 maintains in seller database 248 information on selected sellers' offerings, including for example telecommunications services and products, used to form RFP replies. For example, a seller of telecommunication services might indicate in database 248 terms for certain of its telecommunication services such that TSM 140 can form RFP replies on behalf of the seller. The seller, however, has complete control over these terms and can access database 248 at any point to modify the terms of the bid.

Sellers in this configuration are not required to access RFP database 242 to respond to selected RFPs (e.g., accept or reject RFPs). TSM 140 generates RFP replies on behalf of the sellers with offering information in database 248. Each of these RFP replies constitutes a seller's acceptance to a RFP. These acceptances may be available for a limited period. For example, a buyer begins a session with TSM 140 and completes a RFP indicating a need for a selected telecommunications service and, during that session TSM 140 forms one or more RFP replies on behalf of one or more sellers willing to provide the selected telecommunications service under specific terms that the TSM 140 derives from information in seller database 248. Each reply is available for the buyer to accept only during the current session with TSM 140. Once that session is terminated the RFP reply corresponding to the buyer's RFP is no longer available for the buyer to accept.

Figure 12:
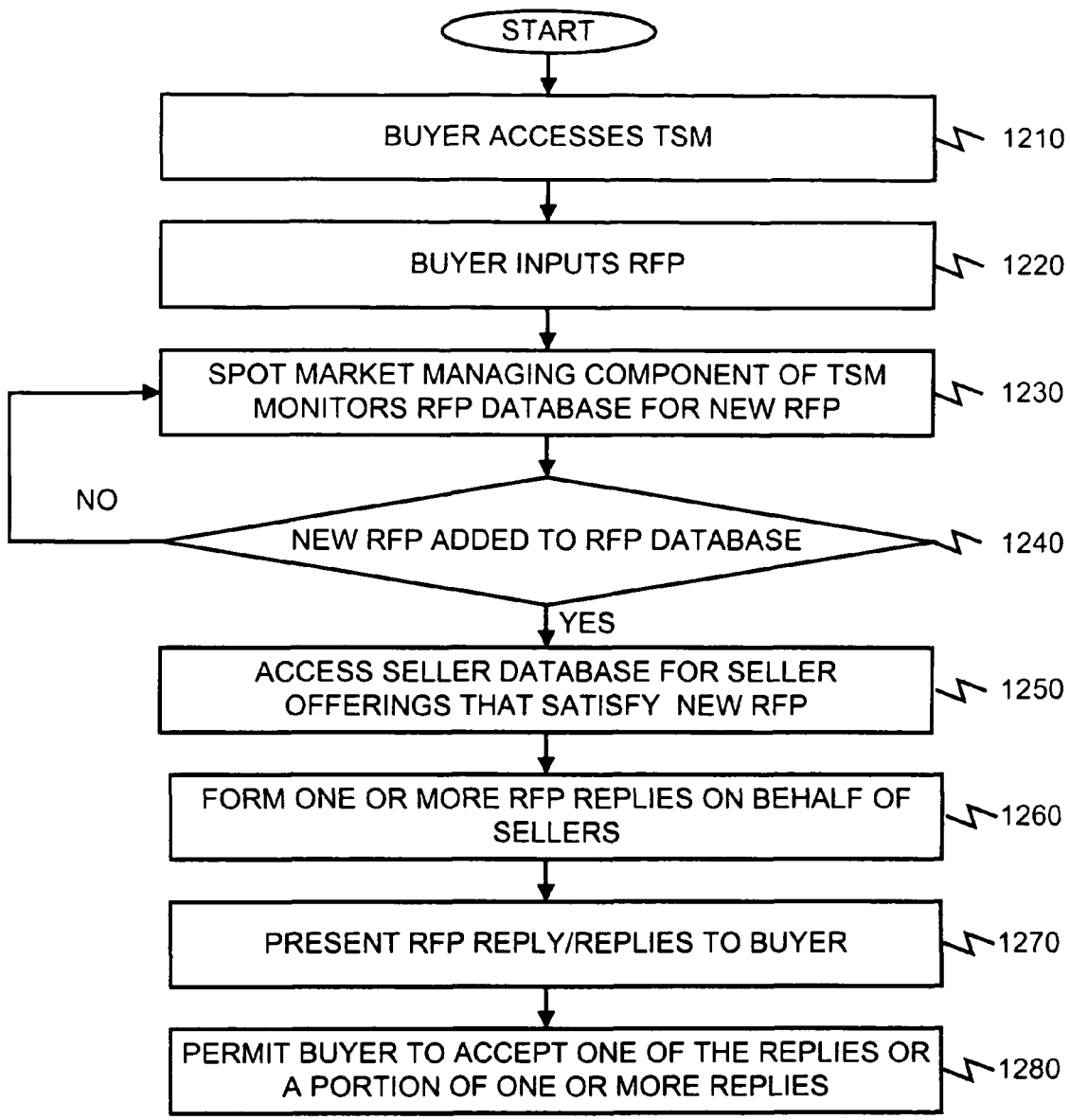
FIG. 12 is a flow chart for processing an RFP using a spot market in a manner consistent with the present invention.

FIG. 12 is a flow chart of the steps used by buyers and sellers in the spot market configuration. In a manner substantially the same as that described above in connection with FIGS. 4 and 5, a buyer first accesses TSM 140 [step 1210] and inputs a RFP [step 1220]. A spot market managing component of TSM 140 monitors the RFP database 242 for newly input RFPs [steps 1230 and 1240]. When a new RFP is added to database 242, the spot market managing component accesses seller database 248 for information on sellers' offerings that may satisfy the requirements of the new RFP [step 1250]. When the spot market managing component identifies offerings in the database, the component forms one or more RFP replies on behalf of sellers that indicate a willingness for TSM 140 to generate RFP replies without involving the sellers in this process [step 1260]. The RFP reply/replies are then presented to the buyer [step 1270], and the buyer may accept a reply [step 1280]. If at any point during this process it is determined that the buyer's session with TSM 140 has terminated the buyer can no longer accept a reply. This permits a seller to modify terms for offerings at any point with assurance that buyers will only receive RFP replies using current information based on the bid response data.

In one embodiment of the invention, a service provider (i.e., seller) is denied access during a session in which a buyer is purchasing telecommunication services, to stored responses that reflect telecommunication service offerings capable of satisfying requested telecommunication services from the buyer. In such a manner, a buyer is assured that the terms or information related to a telecommunication service that such buyer receives or reviews during a session remains unchanged during such session in the event that buyer decides to purchase such telecommunication service. In yet another configuration, a seller may indicate to TSM 140 a willingness to be bound by the terms of a TSM-generated RFP reply. This indication may be in the form of a flag or other code corresponding to a seller's offerings and included in seller database 248.

CONCLUSION

The systems and methods consistent with the present invention provide a forum through which buyers can purchase telecommunication services from a variety of sellers. The present invention levels the playing field by giving buyers more power than they presently have in the buy-sell process.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, the RFP approval process has been described as a group of sellers receiving an RFP and separately determining whether to approve or reject it. Alternatively, TSM 140 may contain a database of previously generated replies from the sellers. TSM 140 may query the database using the terms of the RFP and obtain one or more replies to present to the buyer.

What is claimed is:

1. A system for facilitating the purchase of a plurality of telecommunication services, the system comprising:
a server in communication with a plurality of buyer terminals and a plurality of seller terminals,
wherein said server performs a method stored in a storage medium and executed by one or more processors, comprising:
storing in memory information associated with one or more of a plurality of telecommunication service providers, the information being used to determine one or more system generated responses to a request to purchase at least one of the plurality of telecommunication service, each of the one or more system generated responses being associated with at least one of the plurality of telecommunication service providers and each of the one or more system generated responses being further associated with a related cost for the at least one of the plurality of telecommunication service and an indication associated with the seller controlled geographic footprint wherein the at least one of the plurality of telecommunication service is available;
establishing a session over a network for considering the purchase of the at least one of the plurality of telecommunication service;
receiving the request at a computer on the network, wherein the request is received after the information associated with one or more of a plurality of telecommunication service providers is stored;
determining the at least one system generated response in response to the received request based at least upon the indication associated with the seller controlled geographical footprint; and
preventing a requester from accepting the identified system generated response to the received request after the session is terminated.

2. The system of claim 1, further comprising:
terminating the session.

3. The system of claim 1, further comprising:
permitting access by telecommunication service providers to the stored information during the session.

4. The system of claim 1, further comprising:
denying access by the telecommunication service providers to the stored information during the session.

5. The system of claim 1, further comprising:
denying access by a telecommunication service provider, during the session, to the stored information, wherein the response to which access is denied is the same as the at least one system generated response.

6. The system of claim 1, further comprising:
permitting each telecommunication service provider to modify the stored information to reflect changes in the at least one telecommunication service provided by the service provider.

7. A system for provisioning a plurality of telecommunication service, comprising:
a database containing a set of responses for determining system generated responses to purchase requests for the plurality of telecommunication services, each response reflecting at least one of the plurality of telecommunication service offering associated with a telecommunication service provider, a related cost for the telecommunication service offering, and an indication associated with the seller controlled geographic footprint wherein the at least one of the plurality of telecommunication service is available, each response being determined based at least upon the indication associated with the seller controlled geographical footprint;

a computer in communication with a network and the database comprising a set of instructions, stored in a tangible medium and executed by one or more processors, performs a method comprising the steps of:

(i) receiving a purchase request on behalf of a buyer including information indicating a requested telecommunication service for at least one consumer, (ii) accessing the stored set of responses for determining system generated responses to purchase requests for at least one system generated response reflecting at least one of the plurality of telecommunication service offering capable of satisfying the requested telecommunication service for the at least one consumer, (iii) receiving an acceptance to the system generated response during the session; and (iv) preventing the acceptance to the system generated response after the session is terminated.

8. A system for purchasing a plurality of telecommunication services during a session, the system comprising:

a server in communication with a plurality of buyer terminals and a plurality of seller terminals, wherein said server performs a method stored in a storage medium and executed by one or more processors, comprising:

storing a set of responses in memory for determining system generated responses to purchase requests for the plurality of telecommunication services, each system generated response reflecting at least one of the plurality of telecommunication service offering associated with a telecommunication service provider, a related cost for the telecommunication service offering, and an indication associated with the seller controlled geographic footprint wherein the at least one of the plurality of telecommunication service is available, each system generated response being determined based at least upon the indication associated with the seller controlled geographical footprint:

receiving a purchase request at a computer on a network during the session including information indicating a requested telecommunication service;

accessing the stored set of responses to purchase requests during the session for at least one system generated response reflecting at least one of the plurality of telecommunication service offering capable of satisfying the requested telecommunication service;

permitting a requestor to accept the at least one system generated response during the session;

preventing the requestor from accepting the at least one system generated response after the session is terminated; and preventing the telecommunication service provider from modifying the set of system generated responses during the session.

* * * * *